United States Patent [19]

Nichols et al.

[11] Patent Number: 5,748,454
[45] Date of Patent: May 5, 1998

[54] BATTERY CLIP ASSEMBLY FOR A COMMUNICATION DEVICE

[75] Inventors: Jerry R. Nichols, Boynton Beach; Craig F Siddoway, Davie; Faris S. Habbaba, Boca Raton; Jorge L. Garcia, Plantation, all of Fla.

[73] Assignee: Motorola, Inc., Schaumburg, Ill.

[21] Appl. No.: 709,958

[22] Filed: Sep. 9, 1996

[51] Int. Cl.[6] ............................................. H04B 1/034
[52] U.S. Cl. ........................ 361/814; 361/803; 455/89; 455/90; 455/351; 24/3.11; 24/3.12; 24/3.7
[58] Field of Search ............................ 361/814, 679, 361/801, 803, 683; 455/89, 90, 91, 92, 351; 429/96–100; 379/450; 24/3.11, 3.7, 3.12

[56] References Cited

U.S. PATENT DOCUMENTS

| | | | |
|---|---|---|---|
| 3,623,189 | 11/1971 | Wilczynski | 24/3.11 |
| 3,693,089 | 9/1972 | Hutchinson et al. | 455/351 |
| 3,808,642 | 5/1974 | Nation | 24/3.7 |
| 4,083,481 | 4/1978 | Selinko | 24/3.11 |
| 5,081,709 | 1/1992 | Benyo et al. | 455/348 |
| 5,261,122 | 11/1993 | Otsuki et al. | 455/90 |
| 5,385,282 | 1/1995 | Chen | 455/351 |
| 5,414,596 | 5/1995 | Eaton et al. | 361/814 |

*Primary Examiner*—Leo P. Picard
*Assistant Examiner*—Anthony Dinkins
*Attorney, Agent, or Firm*—M. Mansour Ghomeshi

[57] ABSTRACT

A belt clip (100) attaches to a communication device to be worn by a user. The belt clip (100) includes a base (104) and a flexible latch (106). The base (104) is comprised of a pair of rails (108) that has a pair of skies (110). The pair of rails (108) attach to a battery housing (116) via a pair of slots (120). The belt clip (100) is prevented from moving due to the pair of stop bars (110) being pressed against a pair of posts (124) and secondarily, if the posts are damaged, the stop tabs (110) will press against a pair of casting stops (126). The belt clip is designed to fail or detach before permanently damaging the battery housing. If the belt clip (100) is detached due to extreme pulling, it may be replaced back into the still usable battery housing (116) without the use of a tool.

12 Claims, 3 Drawing Sheets

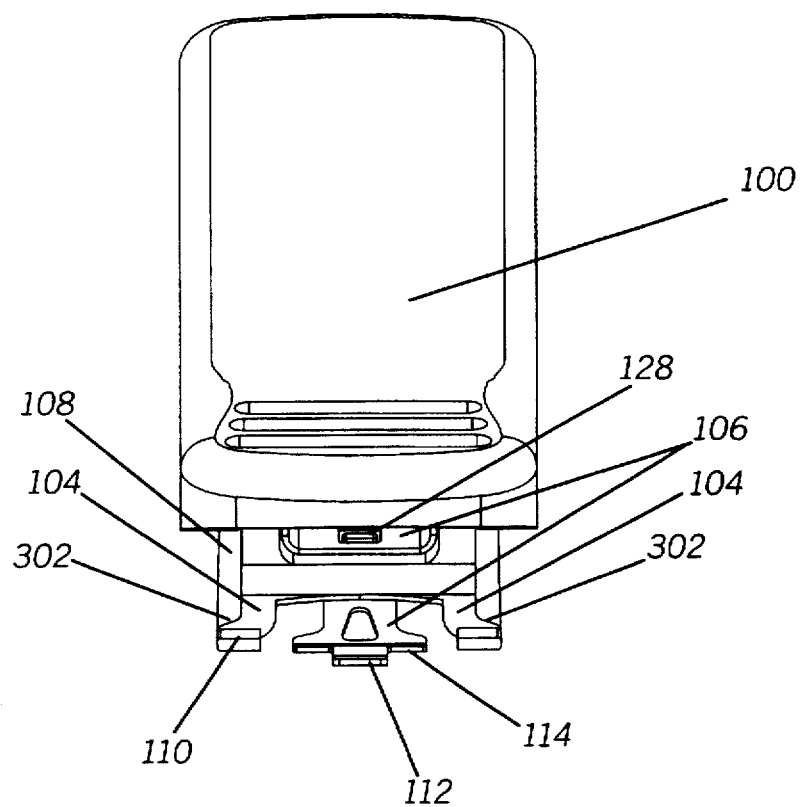

BATTERY CLIP ASSEMBLY FOR A COMMUNICATION DEVICE

FIELD OF THE INVENTION

This invention relates in general to belt clips and more particularly to belt clips used to in conjunction with communication devices to user.

BACKGROUND OF THE INVENTION

The design of belt clips, as the name implies, used in connection with a communication device is known in the art. Belt clips are generally used to attach a device such as a radio communication device to a user's belt. They are often contoured for secured attachment in order to prevent accidental disengagement. Belt clips have a tendency to suffer from mechanical reliability problems, particularly when used in the removal of a communication device from a user. More specifically, when a belt clip is pulled in a direction away from the communication device with extreme force, the belt clip has a tendency to detach from the communication device and cause damage to the housing of the device.

Another problem with many of today's belt clips is that a tool is needed to remove the belt clip from the communication device. The tool most commonly used is a flat blade screwdriver, which might be used to release more conventional latching mechanisms. A need exists for a detachable belt clip that allows a communication device worn by a user to be removed without incurring damage to the communication device. Additionally, it would be desirable for the detachable belt clip to have the capability of being removed from the housing without the use of a tool.

BRIEF DESCRIPTION OF THE DRAWINGS

FIG. 3 is a top front isometric view of a belt clip in accordance with the present invention.

DETAILED DESCRIPTION OF THE PREFERRED EMBODIMENT

Belt clips allow users to transport communication devices without having to hand carry them. However, these communication devices are susceptible to damage due to extreme pulling on the belt clip which commonly occurs, for example, when the user attempts to stand while the belt clip is caught against an object, i.e. a chair arm rest. The present invention provides for a detachable belt clip which does not harm the communication device housing after a significant amount of force is applied to the belt clip.

Figure 1:
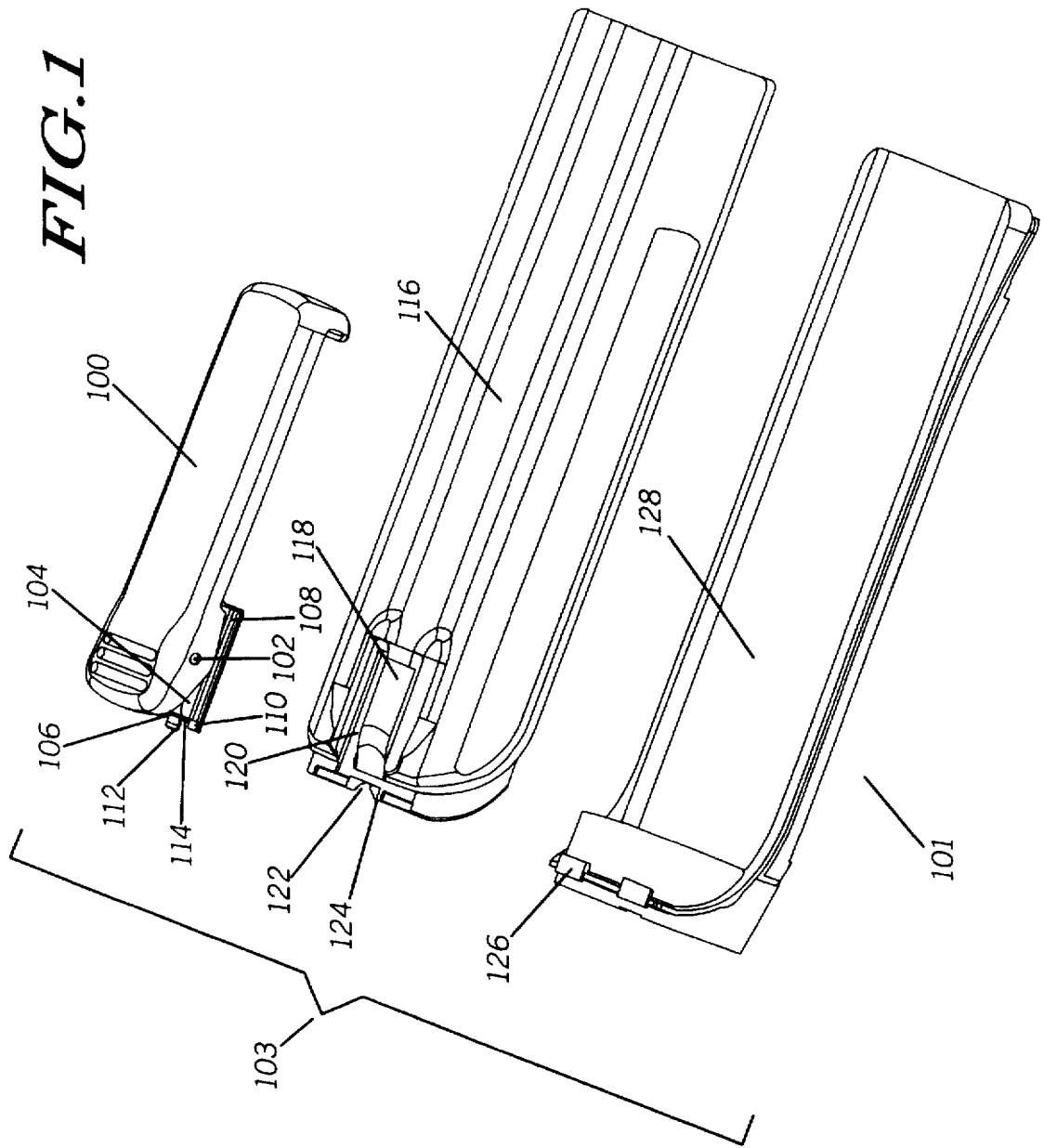
FIG. 1 is an exploded isometric view of a belt clip as used with a communication device in accordance with the present invention.

Referring to FIG. 1, there is shown an exploded isometric view of a belt clip 100 in conjunction with a communication device (103) in accordance with the present invention. The belt clip 100 includes a pin 102, an attachment base 104, and a spring loaded or flexible latch 106. The pin 102 is provided to allow the base 104 to pivot along the pin's 102 longitudinal axis. The base 104 is comprised of a pair of rails 108 and a pair of skies 110. The base 104 is connected to the belt clip 100 via the pin 102. The pin 102 passes through a spring (not shown) that provides a tension force on the belt clip 100 in a direction towards a battery or radio housing 101. When not attached to the communication device, the base 104 is angled towards the body of the belt clip 100 due to the force of the spring. This results in the belt clip 100 being forced in the direction of the battery housing 116. The pair of skies or stop bars 110 extend out from the pair of rails 108. The latch 106 is provided to lock the belt clip 100 to the communication device and includes a finger grip 112 and a pair of stop bars 114. The latch 106 is preferably made of steel to give it the desired spring action. The belt clip 100 is preferably attached to a battery housing 116. The battery housing 116 is comprised of a center ridge 118 located in between a pair of slots 120 which receive the pair of rails 108. The dimensions of the pair of slots 120 are commensurate with the dimensions of the pair of rails 108 so that the pair of rails 108 can mate with the pair of slots 120. In accordance with the present invention, the pair of rails 108 have an angled edge as shown by 302 (FIG. 3) which allows the rails to pull out from the slots under extreme pulling without damaging the battery housing 116 beyond use. The battery housing 116 also includes a finger relief 122 for allowing a finger to reach the finger grip 112 that extends there through. A pair of posts 124 are provided on both sides of the curved section 122 as the locking mechanism for flexible latch 106. These posts 124 prohibit the movement of the belt clip 100 once the pair of rails 108 are within the confines of the pair of slots 120. The height of the pair of slots 120 is preferably substantially equal to the height of the battery housing 116. A pair of casting stops included in the radio casting 128 directly in line with the pair of skies (extending portions) 110 on the base 104, which will prevent the belt clip assembly 100 from disengaging from the radio assembly 103 in the event the post 124 is insupportive. As such, the radio assembly 103 enjoys the benefit of having the belt clip 100 in place with minimum chances of disengagement while providing for the easy removal of the belt clip 100 when the battery 116 is detached from the radio 101.

To attach the belt clip 100 to the battery housing 116, the user slides the pair of rails 108 into the mating pair of slots 120 until the flexible latch 106 snaps beyond the pair of posts 124. Since the pair of rails 108 are not parallel to the belt clip 100, there is a force from the pair of rails 108 acting against the pair of slots 120 which requires the user to lift the belt clip 100 until the pair of rails 108 slide freely into the pair of slots 120. This out of parallel condition along with ramping features provide for a smooth assembly action that does not require any tool. This is a significant advantage over the prior art which requires the user to place a tool under the belt clip to bring its feature similar to 108 closer to be in parallel with its feature similar to 120, in order to engage the belt clip onto the communication device.

When removal of the belt clip 100 from the battery housing 116 is desired, the user presses the finger grip 112 in a direction towards the belt clip 100 until the finger grip 112 is above the pair of posts 124. At this point, the user pushes the belt clip 100 out of the pair of slots 120. Prior art belt clips usually refer the user to the owner's manual for instructions on how to place a tool under the belt clip to negate the force acting against the base. In short, the user of the present invention does not have to expend valuable time searching for a tool in order to attach or detach the belt clip 100, for the user intuitively depresses the finger grip 112 through finger relief 122 to make the disassembly.

Another advantage of the belt clip of the present invention is that both the rails 104 and/or the slots 120 are formed with angles. Having these two areas designed with angled rails prevents the pair of slots 120 from fracturing when under extreme pulling. In other words, the angled surface(s) 302 provide for the disengagement of the belt clip 100 from the battery housing 116 with minimum damage thereto when excessive load is applied to remove the belt clip. For the purposes of the above reference, minimum damage is defined as a battery housing that is reusable even after the belt clip has been forcefully removed. When yielding does occur, the rails 108 do not destroy the slots 120. In fact, upon misalignment, the pair of rails 108 slide out from between the pair of slots 120 with the slots having only a small degree of yielding and without any harm to the belt clip rails 108. Therefore, the belt clip 100 can be reassembled for further use even though the pull strength has been compromised. Once extreme pulling occurs, either the lever of the clip 100 breaks or the plastic slot 120 yields to the metal interface of the base 104, and the battery housing may be reused by reinserting the base 104. This reusability is highly significant as the clip assemblies of the prior art would render the battery unusable under similar extreme pulling. Furthermore, the assembly of the present invention enjoys this additional benefit that even if damage results after several extreme pulls, it is damage to the belt clip and not the battery as is the case in the prior art. This is highly desirous since the belt clip carries a price tag much lower than that of the battery.

Figure 2:
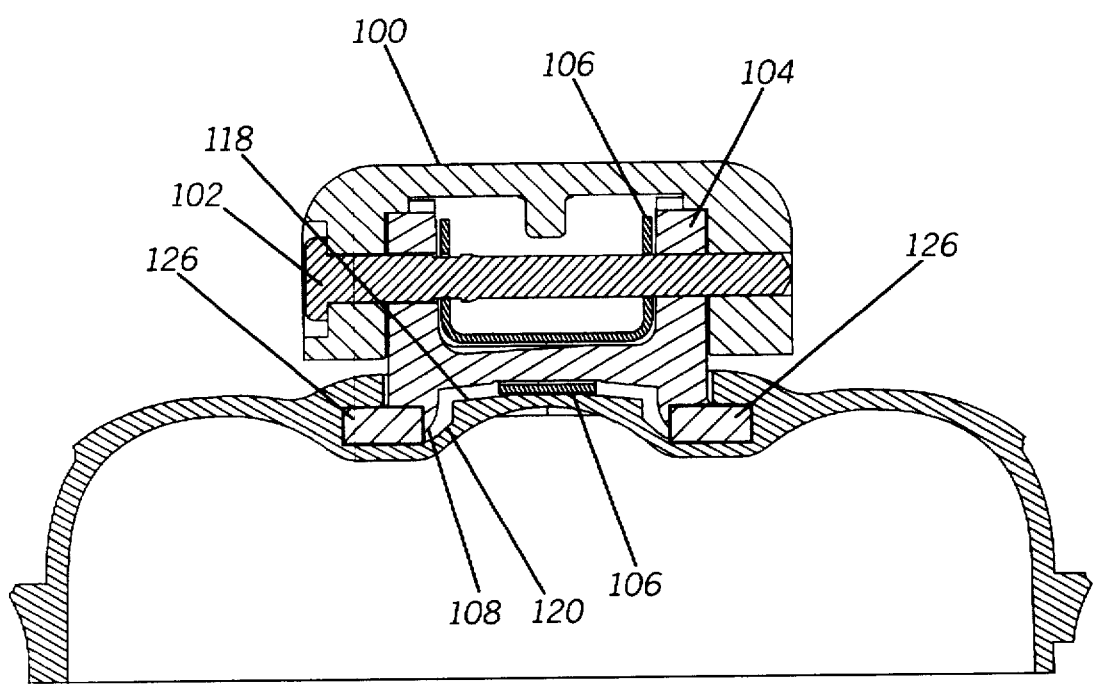
FIG. 2 is a top cross-sectional view of a belt clip attached to a battery housing in accordance with the present invention.

Referring to FIG. 2, there is shown a top cross-sectional view of a belt clip 100 in accordance with the present invention. As can be seen, a flexible latch 106 is wrapped around a base 104 and a lip 123. When a pair of rails 108 are positioned within a pair of slots 120, a pair of protruding tabs 110 extending from the pair of rails 108 are pined against a pair of casting stops 126 that are attached to the radio casting. The pair of casting stops 126 are provided to deter the belt clip 100 from sliding out from its secured location within the pair of slots 120 if the plastic posts 124 were to yield from excessive forces applied through the steel flexible latch 106 at skies or stop tabs 114. The prior art lacks such a protective feature, therefore if its feature similar to 124 were to yield, the belt clip would become detached and loss of radio could result.

Referring to FIG. 3, there is shown a top front isometric view of the belt clip 100 in accordance with the present invention. A base 104 has a pair of rails 108 with a pair of skies 110. The pair of rails 108 are sufficiently spaced to allow a finger to depress the finger grip 112 of a flexible latch 106. The latch 106 is wrapped around the base 104 of the belt clip 100. The latch 106 is connected to the base 104 at a connecting point 128. The connecting point 128 ensures that the flexible latch 106 remains stationary. The flexible latch 106 includes a pair of stop tabs 114 which lock the belt clip 100 behind a pair of posts (See 124, FIG. 1).

In essence, the belt clip of the present invention provides the user with the assurance that even when an extreme pulling occurs, the communication device housing remains usable. The belt clip can be reassembled without the aid of a tool. The belt clip assembled by sliding a pair of rails into a mating pair of slots. Once attached, the pair of posts and the pair of casting stops both act to prohibit the mobility of the belt clip. If the belt clip does become detached without fracturing, the battery slots yields only a small degree and the communication device is still usable.

We claim:

1. A communication device, comprising:
   a radio housing;
   a battery housing coupled to the radio housing, the battery housing including:
   a pair of slots;
   at least one post;
   a belt clip coupled to the battery housing, the belt clip including:
   an attachment base; and
   a spring loaded latch coupled to the base;
   the base including a pair of rails, the rails slidably engaging into the slots until the latch mates with the post; and
   the radio housing including a stop for preventing disengagement of the belt clip from the communication device.

2. The radio communication device of claim 1, wherein the spring loaded latch includes a sheet metal latch.

3. The radio communication device of claim 1, wherein the spring loaded latch includes at least one stop tab.

4. The radio communication device of claim 1, wherein the attachment base includes angled surfaces to provide for the disengagement of the belt clip from the battery housing with minimum damage when excessive force is applied.

5. A radio communication device comprising:
   a belt clip having a base for attaching the belt clip to the radio, the base including:
   a pair of rails having extending portions on the end thereto;
   a spring loaded latch wrapped around the base for securing the belt clip to the radio;
   a battery housing including:
   a pair of slots for accommodating the pair of rails;
   at least one post for locking the belt clip onto the battery; and
   at least one stop for stopping movement of the belt clip when the battery housing is attached to the radio.

6. The radio communication device of claim 5, wherein the battery housing includes a lip upon which the flexible latch rests.

7. The radio communication device of claim 5, wherein the pair of rails are formed from substantially stronger material than the pair of slots.

8. A radio communication device of claim 5, wherein the base comprises a cast base.

9. A radio communication device of claim 5, wherein the pair of rails include angled edges.

10. A radio communication device of claim 5, wherein at least one stop includes a casting stop.

11. A communication device, comprising:
    a radio housing, including:
    a pair of slots;
    at least one post;
    a belt clip coupled to the housing, the belt clip including:
    a base;
    a spring loaded latch wrapped around the base;
    the base including a pair of rails, the rails slidably engaging into the slots until the latch mates with at least one post; and
    a battery including a stop for preventing disengagement of the belt clip from the communication device.

12. The radio communication device of claim 11, wherein the battery housing includes a center ridge.

* * * * *